(12) United States Patent
Poltorak

(10) Patent No.: US 8,268,019 B2
(45) Date of Patent: Sep. 18, 2012

(54) METHOD FOR MAKING CAPACITOR ELEMENT

(75) Inventor: Jeffrey P. Poltorak, Simpsonville, SC (US)

(73) Assignee: Kemet Electronics Corporation, Greenville, SC (US)

(*) Notice: Subject to any disclaimer, the term of this patent is extended or adjusted under 35 U.S.C. 154(b) by 527 days.

(21) Appl. No.: 12/144,857

(22) Filed: Jun. 24, 2008

(65) Prior Publication Data

US 2008/0260567 A1 Oct. 23, 2008

Related U.S. Application Data

(62) Division of application No. 11/710,726, filed on Feb. 26, 2007, now Pat. No. 7,569,080, which is a division of application No. 10/730,736, filed on Dec. 8, 2003, now Pat. No. 7,207,103.

(51) Int. Cl.
*H01G 9/15* (2006.01)

(52) U.S. Cl. ............ 29/25.03; 29/25.42; 29/25.41; 29/727; 361/523; 361/525; 264/219

(58) Field of Classification Search .......... 29/729, 29/739, 738, 25.01–25.04, 25.35–25.42; 361/523, 528, 529–533; 264/219, 123, 109; 425/352, 356

See application file for complete search history.

(56) References Cited

U.S. PATENT DOCUMENTS

| | | | |
|---|---|---|---|
| 3,345,545 A | 10/1967 | Bourgault et al. | 317/230 |
| 3,642,401 A | 2/1972 | Wilson | 425/137 |
| 3,688,161 A | 8/1972 | Klein et al. | 317/230 |
| 4,061,453 A * | 12/1977 | DeSantis | 425/78 |
| 4,199,539 A | 4/1980 | Von Herrmann et al. | 264/0.5 |
| 4,841,364 A | 6/1989 | Kosaka et al. | 348/86 |
| 4,945,452 A * | 7/1990 | Sturmer et al. | 361/529 |
| 5,075,940 A * | 12/1991 | Kuriyama et al. | 29/25.03 |
| 5,498,147 A * | 3/1996 | Katagiri et al. | 425/78 |
| 5,667,536 A * | 9/1997 | Hasegawa | 29/25.03 |
| 5,949,639 A | 9/1999 | Maeda et al. | 361/523 |
| 6,099,772 A * | 8/2000 | Hinzmann et al. | 264/109 |
| 6,191,936 B1 | 2/2001 | Webber et al. | 361/528 |
| 6,320,742 B1 | 11/2001 | Wada et al. | 361/528 |
| 6,400,398 B1 | 6/2002 | Chen | 348/95 |
| 6,546,837 B1 | 4/2003 | Neyer | 86/20.1 |
| 6,804,876 B1 | 10/2004 | Ito et al. | 29/602.1 |
| 7,207,103 B2 * | 4/2007 | Poltorak | 29/729 |

* cited by examiner

*Primary Examiner* — Minh Trinh

(74) *Attorney, Agent, or Firm* — Joseph T. Guy; Nexsen Pruet, LLC

(57) ABSTRACT

A powder compaction press having opposed rib and channel punches which are interleaved and a production method are used to produce capacitor elements having a uniform compaction density and which are free of surface imperfections.

3 Claims, 6 Drawing Sheets

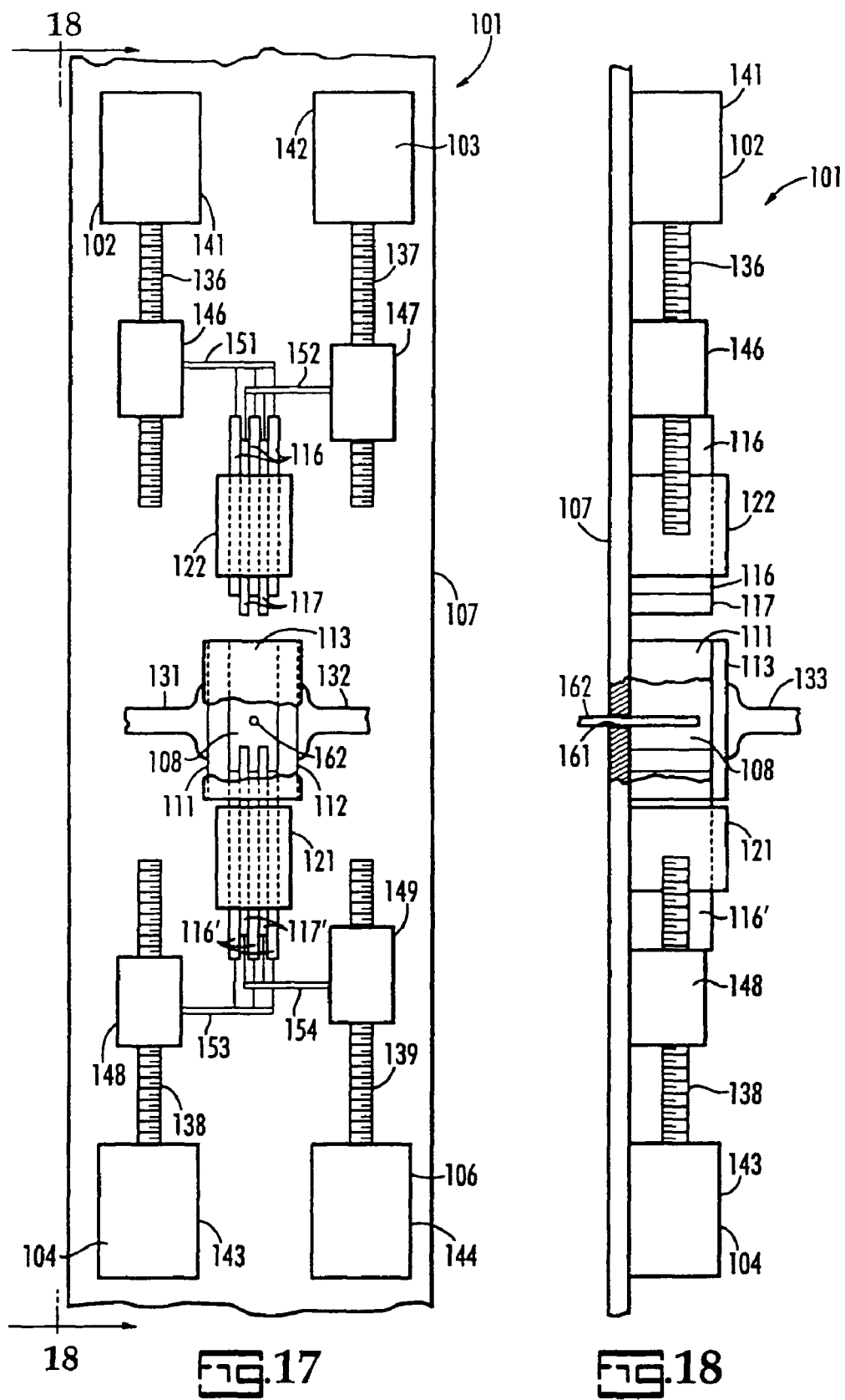

US 8,268,019 B2

METHOD FOR MAKING CAPACITOR ELEMENT

RELATED APPLICATIONS

This application is a division of U.S. patent application Ser. No. 11/710,726 filed Feb. 26, 2007 now U.S Pat. No. 7,569,080 which is a division of U.S. patent application Ser. No. 10/730,736 filed Dec. 8, 2003 now U.S. Pat. No. 7,207,103 issued Apr. 24, 2007.

BACKGROUND OF THE INVENTION

Compaction of tantalum or valve powder to make capacitor elements is known in the art as evidenced by the disclosure of U.S. Pat. No. 5,949,639 issued Sep. 7, 1999 to T. Malda et al. for a Capacitor Element for Solid Electrolytic Capacitor, Device and Process for Making the Same and by the disclosure of U.S. Pat. No. 6,191,936 issued Feb. 20, 2001 to D. A. Webber et al. for a Capacitor Having Textured Pellet and Method for Making Same.

When making capacitor anodes by compaction of valve powder it is desired to have uniform compaction. However when the capacitor element has an irregular exterior surface the compaction device typically does not produce a uniformly compacted capacitor element. It has also been found that the capacitor element may be damaged by the withdrawal of the punches used in forming such an element.

SUMMARY OF THE INVENTION

It is a primary object of the invention to form a capacitor element having an irregular exterior surface by compacting valve powder in such a way that the degree of compaction is uniform throughout the element. It is also an object of the invention to provide a powder compaction press and method of operation which uniformly compacts a capacitor element having an irregular exterior and which does not damage the capacitor element when the forming punches are withdrawn from the capacitor element.

The capacitor element is formed in a horizontal press or in a vertical press using opposed rib punches and opposed channel punches arranged in interleaved fashion. The opposed rib and channel punches are so positioned in their non compacting position, in which powder in the compression chamber is not under compression, that in traveling to their compression positions the powder will be compressed to the same degree throughout the capacitor element. After the capacitor element is formed, the opposed channel punches are withdrawn first to avoid friction destruction of the element.

BRIEF DESCRIPTION OF THE DRAWINGS

Two embodiments of the invention are illustrated in the drawings in which

FIG. 17 is a side view of a second embodiment in the form of a vertical press with parts broken away for illustration purposes;

FIG. 18 is a view taken on the line 18-18 in FIG. 17;

DETAILED DESCRIPTION OF THE INVENTION

Figure 1:
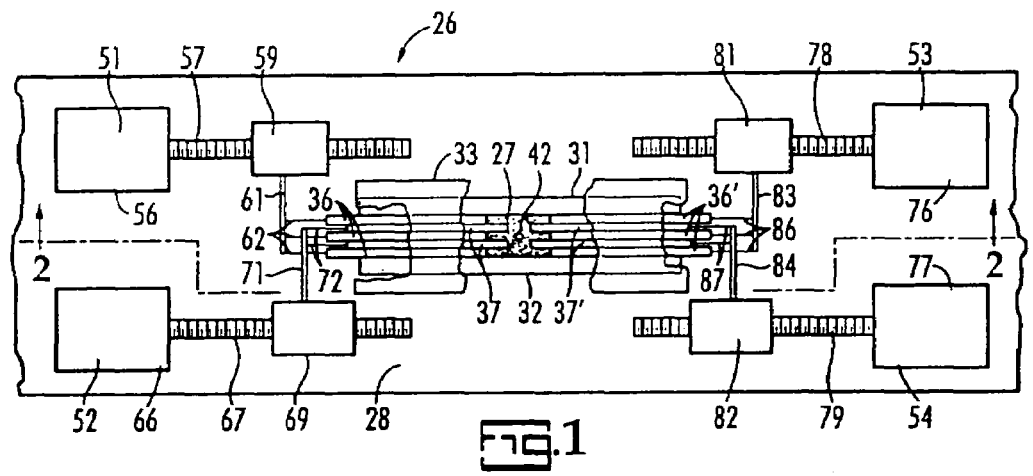
FIG. 1 is a top view of a first embodiment in the form of a horizontal press with parts broken away for illustration purposes.
Figure 2:
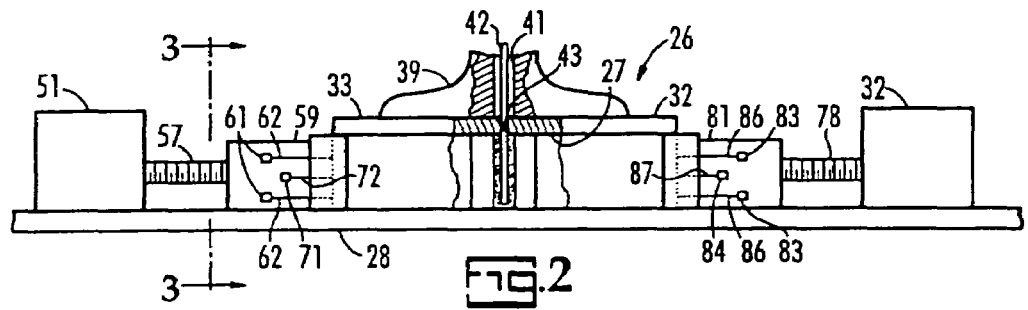
FIG. 2 is a view taken on line 2-2 in FIG. 1 with parts broken away for illustration purposes.
Figure 3:
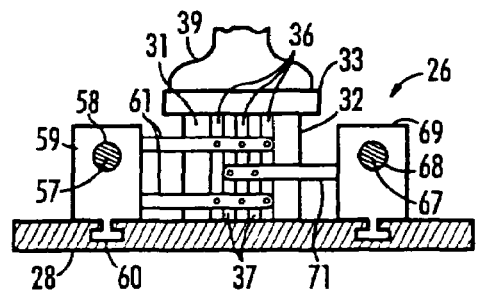
FIG. 3 is a view taken on line 3-3 in FIG. 1.

A horizontal powder press 26 is illustrated in FIGS. 1, 2 and 3. An elongated compression chamber 27 of uniform quadrilateral cross section is formed by a bottom wall in the form of flat support 28, a pair of parallel side walls 31, 32 having confronting parallel vertical surfaces of equal height extending upwardly from the upwardly facing surface of the support 28 and a top wall 33 having a flat bottom surface in engagement with the coplanar top surfaces of the side walls 31, 32. A set of six opposed rib punches 36, 36' and a set of four opposed channel punches 37, 37' extend into opposite open ends of the compression chamber 27. The linearly reciprocable rib punches 36 and channel punches 37 are interleaved flat plates. The top wall 33 is held in place on the top surface of the side walls 31, 32 by a press foot 39 which has a vertically extending opening 41 for accommodating a wire 42 inserted through an opening 43 in the top wall 33 and into the powder compression chamber 27. In other words, the rib punches 36 are interposed in side by side relation with the channel punches 37 and the rib punches 36' are in interposed relation with the channel punches 37'. The three rib punches 36 are aligned with the three rib punches 36' and the two channel punches 37 are aligned with two channel punches 37'.

Four powered drive mechanisms 51, 52, 53, 54 are mounted on the support 28. The drive mechanism 51 includes an electric motor 56 secured to the support 28 and driving a horizontally disposed screw 57 which extends through a threaded opening 58 in a thrust block 59. The thrust block 59 has a T-bar tongue and groove connection 60 with the support 28 permitting the thrust block 59 to move in the axial direction of the screw 57 when the screw is rotated by the motor 56. The thrust block 59 includes a pair of cantilever arms 61 which are connected to the rib punches 36 by thrust bars 62. The drive mechanism 52 includes a powered driver in the form of an electric motor 66 having an output screw 67 in threaded engagement with an internally threaded opening 68 through a thrust block 69. The thrust block 69 has a T-bar tongue and groove connection with the support 28. The thrust block 69 includes a cantilever arm 71 which is connected to the channel punches 37 by thrust bars 72.

The drive mechanisms 53, 54 in a similar manner include electric drive motors 76, 77, screws 78, 79 and screw blocks 81, 82 connected to the rib and channel punches 36', 37' by thrust arms 83, 84 and thrust bars 86, 87.

Figure 4:
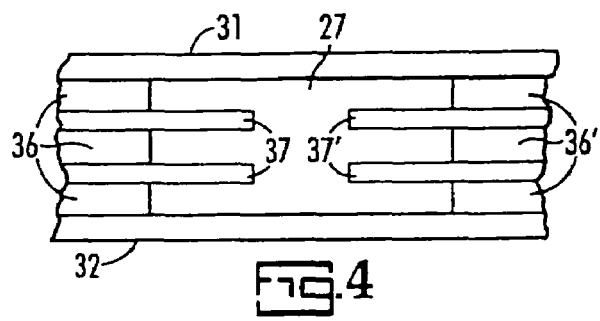
FIG. 4 is a partial top view of the press of FIG. 1 showing rib and channel punches in their non-compacting position.
Figure 5:
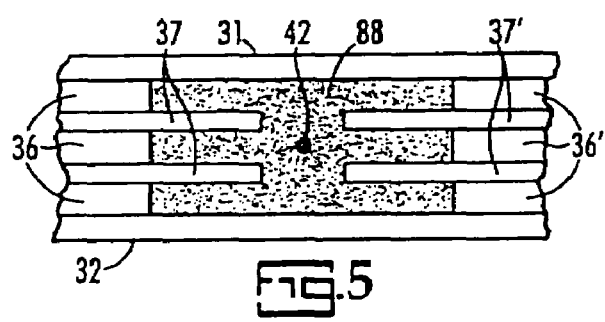
FIG. 5 is a top view similar to FIG. 4 showing powder deposited in the compression chamber.
Figure 6:
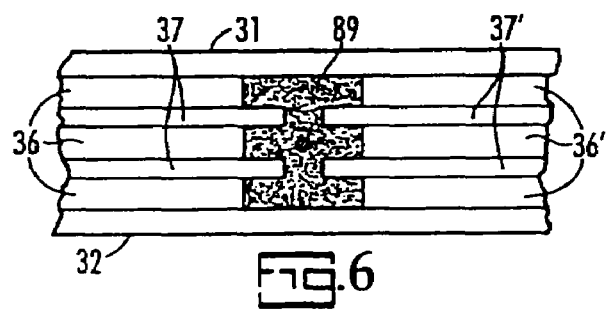
FIG. 6 is a top view of the compression chamber showing the rib and channel punches in their compacting positions and the capacitor element in its compacted condition.

FIG. 4 is a top view of an empty compression chamber 27 of the press 26 with the top wall 33 and the press foot 39 removed. The compression chamber 27 is ready to be filled with valve powder. The rib and channel punches 36, 36', 37, 37' have been adjusted to appropriate non-compacting or powder loading positions to achieve the desired degree of compaction during the compaction phase of operation. In the example illustrated in FIGS. 4-9 there is a 3 to 1 compaction ratio. FIG. 5 shows the compaction chamber filled with valve powder 88. The top wall, not shown, is placed on top of the side walls 31, 32 and the press foot 39, not shown, is brought to bear against the top wall 33, not shown. The wire 42 is then extended an appropriate depth into the powder 88. The powder 88 is now ready to be compacted into a capacitor element. During, compression, in the illustrated example, there is a 3 to 1 reduction in the distance between the opposed ends of the rib punches 36, 36' and there is a 3 to 1 reduction in the distance between the ends of the channel punches 37, 37' during compression. Thus both the rib areas and the web areas between the opposed channels will be equally compressed, that is, compressed to the same degree or extent. FIG. 6 shows the completion of the compaction step in the manufacturing process in which the rib and channel punches 36, 36', 37, 37' have been moved to their compacting position. The punches are moved from their non-compacting or chamber loading position shown in FIGS. 4 and 5 to their compacting position shown in FIG. 6 at speeds proportional to the distances they move from their non-compressing positions to their compressing positions. The rib punches 36, 36' move faster than the channel punches 37, 37' and both sets of punches arrive simultaneously at their compression or compaction positions shown in FIG. 6. Thus the rate of compaction of the powder in the rib areas of the element 89 is the same as the rate of compaction in the web between the oppositely disposed channels in the element 89. By starting compaction with the punches spaced at distances proportional to the finished width of the rib and web areas of the capacitor element 89 and by moving the punches during compression at speeds proportional to the distances traveled during compression, an element 89 of uniform density is produced.

Figure 7:
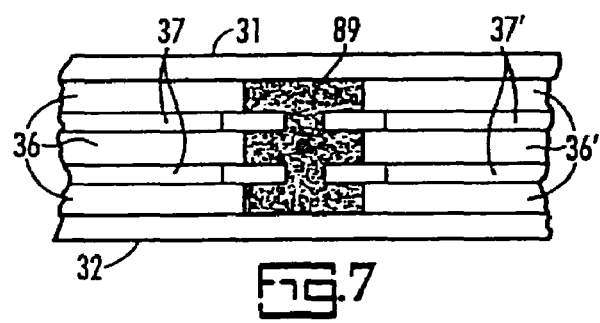
FIG. 7 is a top view of the compression chamber showing withdrawal of the channel punches from the capacitor element.

In the next manufacturing step, shown in FIG. 7, the channel punches 37, 37' are withdrawn from the channels formed in the element 89 and for operational purposes may be withdrawn to their powder loading positions shown in FIGS. 4 and 5. By keeping the rib punches 36, 36' in their compacting position while the channel punches 37, 37' are withdrawn, breakdown of the edges of the formed element 89 are avoided.

Figure 8:
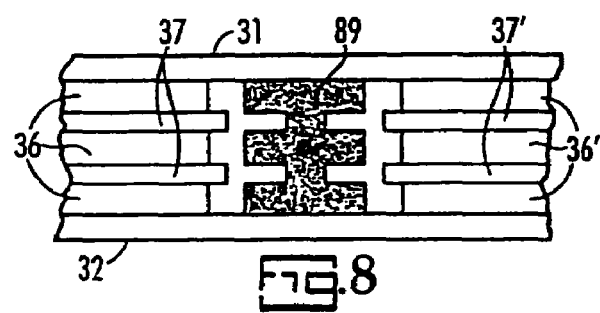
FIG. 8 is a top view of the compression chamber showing the rib and channel punches withdrawn from the capacitor element.
Figure 9:
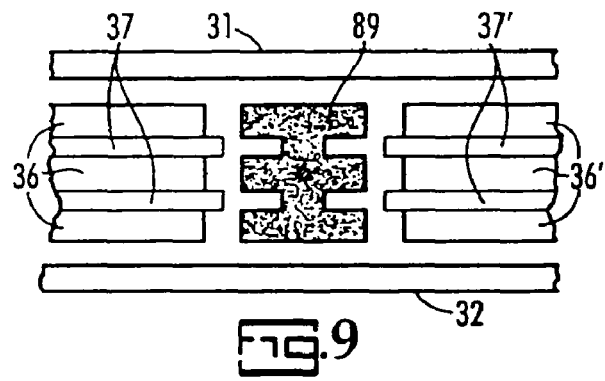
FIG. 9 is a top view showing withdrawal of a pair side walls of the compression chamber.

As shown in FIG. 8, the rib punches 36, 36' have been withdrawn and may be positioned in their chamber loading position shown in FIGS. 4 and 5. In the next step of manufacture, shown in FIG. 9, the press foot 39 and the top wall 33 are raised and the side walls 31, 32 are moved laterally away from one another to completely release the element 89, which may now be removed without burnishing of the sides of the element 89.

Figure 10:
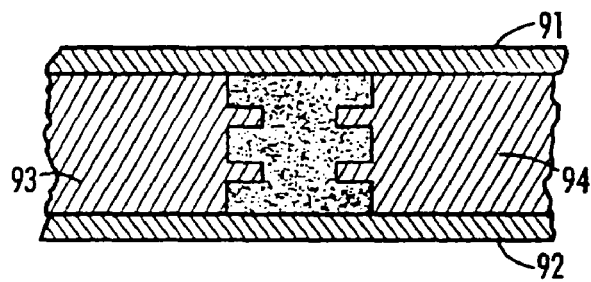
FIG. 10 is a section of a prior art press showing powder in a compression chamber prior to compaction.
Figure 11:
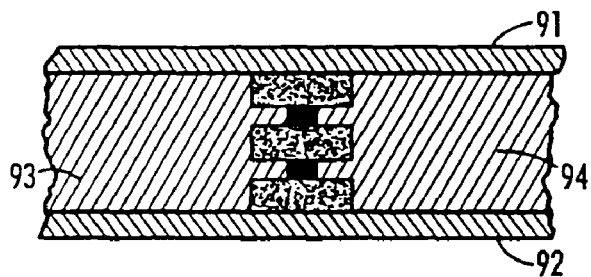
FIG. 11 is a section showing the punches of the prior art press of FIG. 10 in their compaction position.
Figure 12:
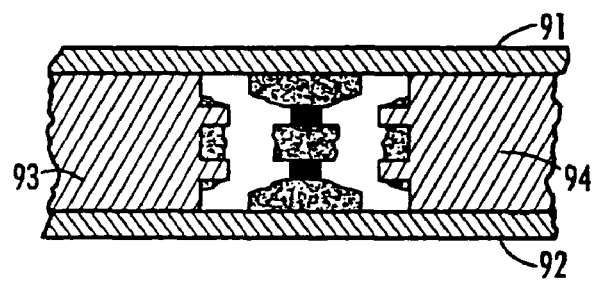
FIG. 12 is a section showing the punches of the prior art press withdrawn from the compacted capacitor element.

FIGS. 10, 11 and 12 show a prior art press manufacturing a capacitor element. After the compaction chamber, formed by side walls 91, 92, a bottom wall, not shown, and opposed punches 93, 94, is filled with powder, as shown in FIG. 10, and the top wall is closed, the opposed punches 93, 94 are moved to their compaction positions shown in FIG. 11. Since the channel forming parts of the punches 93, 94 move the same distance as the rib forming parts, the web areas between the channels are compressed to a greater extent than the ribs. The non-uniform compaction of the element is highly undesirable from a capacitor quality standpoint. When the punches 93, 94 are released or withdrawn, as shown in FIG. 12, portions of the element tend to break away because the pressure of the compacted powder within the confines of the punches is greater than the tensile strength of the compacted element. The foregoing deficiencies in the illustrated prior art powder compaction press are remedied by the herein disclosed invention.

Figure 13:
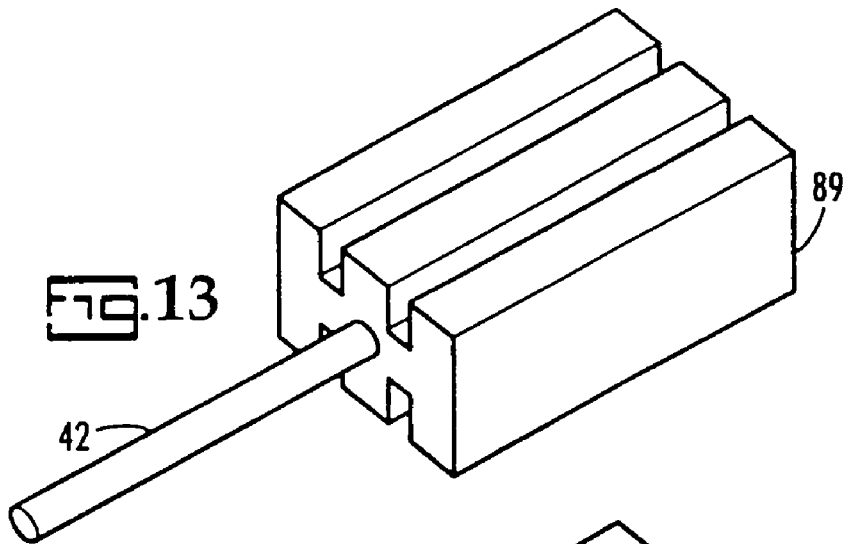
FIG. 13 is a perspective view of a capacitor element with a single lead wire.
Figure 14:
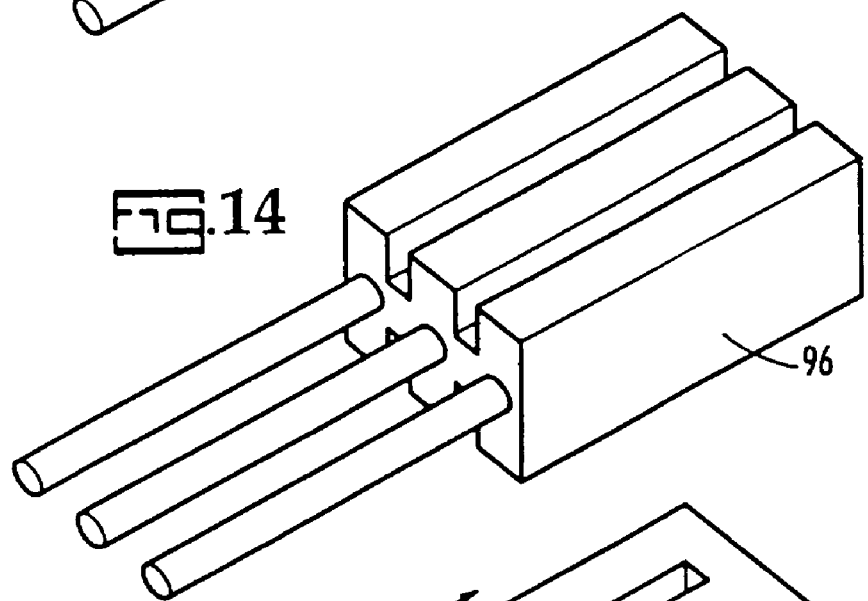
FIG. 14 is a perspective view of a capacitor element with three lead wires.
Figure 15:
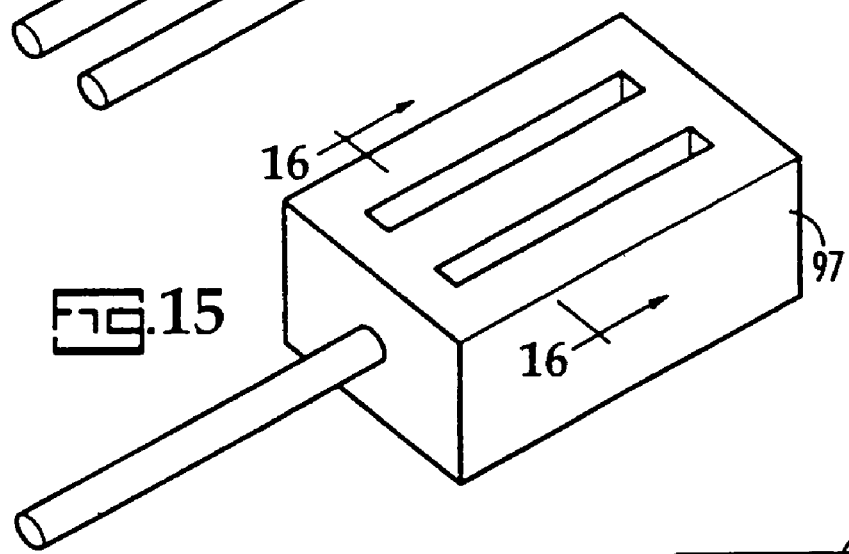
FIG. 15 is a perspective view showing a modified capacitor element.
Figure 16:
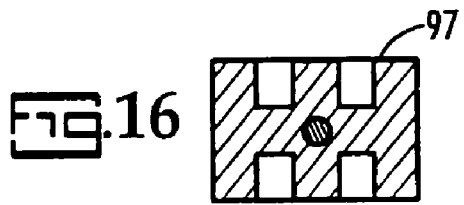
FIG. 16 is a view taken on line 16-16 in FIG. 15.

FIG. 13 is a perspective view of the capacitor element 89 formed by the press 26. FIGS. 14 shows a capacitor element 96 with three wires and FIGS. 15 and 16 show a capacitor element 97 which has been formed, according to this invention, using a single pair of opposed rib punches and two pair of opposed channel punches.

FIGS. 17 and 18 schematically illustrate a vertical press 101 embodiment of the invention. Four powered drive mechanisms 102, 103, 104, 106 are secured to a vertical support wall 107 and a valve powder compaction chamber 108 is formed by the vertical wall 107, side walls 111, 112, 113 and sets of opposed rib punches 116, 116' and sets of opposed channel punches 117, 117' which are supported in guide blocks 121, 122 mounted on the vertical wall 107. The side walls 111, 112, 113 are releasably held in place by press feet 131, 132, 133. Drive screws 136, 137, 138, 139 driven by electric motors 141, 142, 143, 144, threadingly engage threaded openings in thrust blocks 146, 147, 148, 149 which have siding tongue and groove connections with the wall 107 similar to that provided for the embodiment of the invention shown in FIGS. 1-3. The support wall 107 has an opening 161 through which a capacitor wire 162 can be inserted into the compaction chamber 108.

Figure 19:
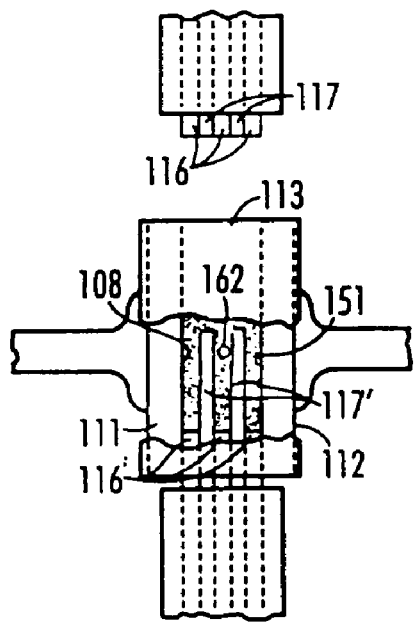
FIG. 19 is a partial side view with parts broken away to show a compaction chamber filled with powder.
Figure 20:
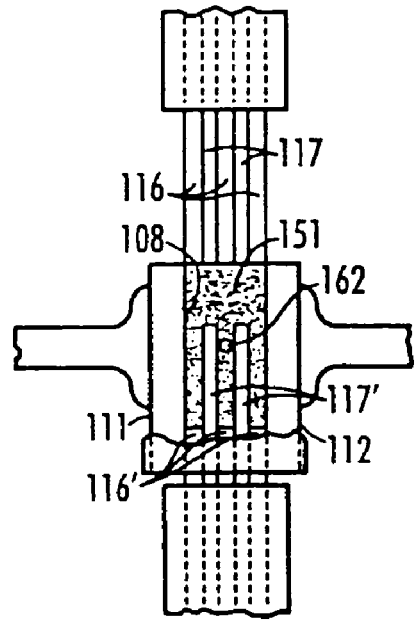
FIG. 20 is a partial side view showing upper rib and channel punches lowered to the top of the filled compaction chamber.

FIG. 19 shows the upper rib punches 116 and the upper channel punches 117 withdrawn from the compression chamber 108 sufficiently to permit valve powder to be placed in the compression chamber 108. The upper ends of the lower rib and lower channel punches 116', 117' are positioned to provide the desired amount of powder 151 for the element to be formed when the chamber 108 is filled to the top. The upper rib and channel punches 116, 117 are then lowered to close the top opening of the compression chamber 108 as shown in FIG. 20.

Figure 21:
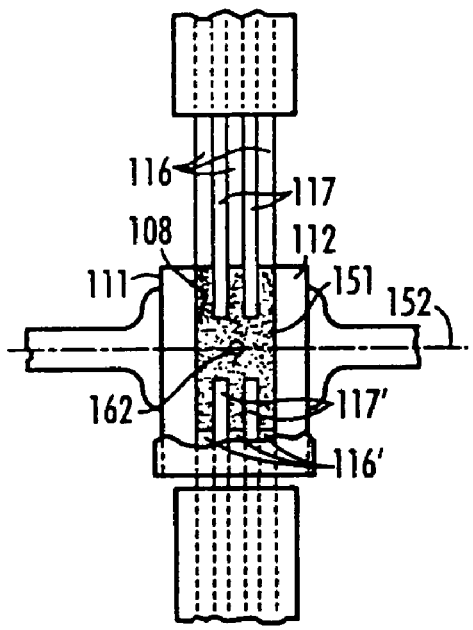
FIG. 21 is a partial side view showing the rib and channel punches adjusted to a desired pre-compaction position.
Figure 22:
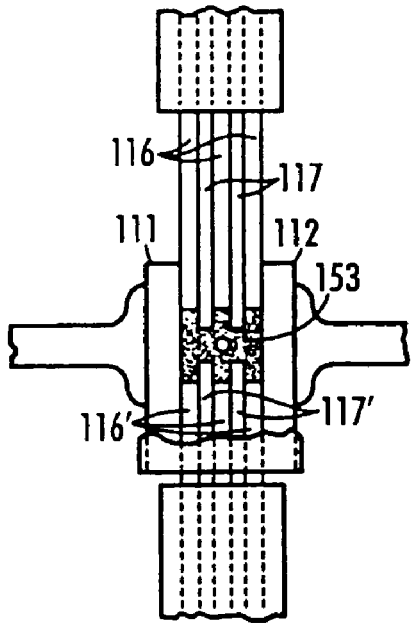
FIG. 22 is a partial side view showing the rib and channel punches in their compacting positions and the capacitor element in its compacted condition.

As shown in FIG. 21 the upper and lower channel punches 117, 117' are next adjusted to extend an equal distance into the compression chamber 108. This is accomplished by simultaneously lowering the upper and lower channel punches 117, 117' the same distance. The press is now ready for the compaction step. It will be noted that the wire 162 is centrally located in relation to the powder 151 to be compressed, the punches 116 and 116' are spaced equal distances from a horizontal plane 152 through the center of the wire 162 and the punches 117, 117' are also spaced equal distances from the horizontal plane 152. The element 153 shown in FIG. 22 is formed by a three to one compression of the powder 151. In other words the distance between the opposed rib punches 116 and 116', shown in FIG. 21, is reduced to one third in the compression step. Likewise the distance between the opposed channel punches 117, 117" shown in FIG. 21, is also reduced to one third in the compression step. In order to effect an equal rate of compression in the rib and web areas of the element, the opposed rib punches 116, 116' are moved toward one another faster than the channel punches 117, 117' are moved toward one another. The ratio of the speeds at which the rib and channel punches move in the compaction step is equal to the ratio of the distances said rib and channel punches move during the compaction step. An equal rate of compaction of the powder in the rib areas and the web areas between the channels is effected, thus avoiding lateral shifting of the powder during compaction. A uniform compaction density of the element 153 is achieved.

Following the compaction step illustrated by FIG. 22 the channel punches 117, 117' are retracted by the drive mechanisms 102, 103, 104, 106 from the element 153 and next the rib punches 116, 116' are retracted to a non-compacting position. Then the side walls 111, 112 and 113 are moved away from the element 153 to permit the element 153 to be removed without burnishing its surfaces. This retraction of the punches 116, 116', 117, 117' and shifting of the side walls is similar to the procedure employed in fabricating the element 92 by the horizontal press shown in FIGS. 1-9.

The herein disclosed horizontal press 26 and the vertical press 101 carry out a method of manufacturing a capacitor element which produces high quality capacitor elements having uniform compaction density and unburnished surfaces free of defects.

What is claimed is:

1. A method of making a capacitor element having opposed indentations in its laterally opposite sides defining ribs, oppositely disposed channels and at least one web between said oppositely disposed channels comprising the steps of:
    providing a compression chamber;
    placing a predetermined amount of valve powder in said compression chamber;
    compacting said powder with interleaved sets of opposed rib and channel punches to form said ribs and channels by moving said punches from non-compacting positions to compacting position producing the same degree of compaction in said ribs as in said web between said channels; and
    withdrawing said punches in which said channel punches are withdrawn from said capacitor element prior to withdrawal of said rib punches
    wherein said rib punches have a first distance in a non-compacting position, a second distance in a compacting position and a first ratio which is said first distance divided by said second distance and said channel punches have a third distance in a non-compacting position, a fourth distance in a compacting position and a second ratio which is said third distance divided by said fourth distance wherein said first ratio and said second ratio are the same.

2. The method of claim 1 wherein said rib punches move at a speed which is proportional to said first ratio.

3. The method of claim 1 wherein said channel punches move at a speed which is proportional to said second ratio.

\* \* \* \* \*